April 12, 1955

C. C. WETZEL 2,705,986

VEGETABLE CUTTING DEVICES

Filed April 22, 1950

INVENTOR.
Clifford C. Wetzel.
BY
Frank C. Fearman.
ATTORNEY

United States Patent Office 2,705,986
Patented Apr. 12, 1955

2,705,986

VEGETABLE CUTTING DEVICES

Clifford C. Wetzel, Ithaca, Mich.

Application April 22, 1950, Serial No. 157,424

2 Claims. (Cl. 146—164)

This invention relates to vegetable cutting machines of the continuous operation type.

One of the prime objects of the invention is to design a power-driven vegetable cutting machine of large capacity in which potatoes and other vegetables of various sizes may be cut into pieces of suitable size for planting, human consumption, or for feeding to livestock.

Another object is to provide a very simple, practical and relatively inexpensive vegetable cutting machine equipped with yieldable means for carrying the vegetables downwardly and into engagement with the cutting elements.

A further object still is to design a simple, economical, smooth-operating mechanism in which potatoes, cucumbers, and similar vegetables are individually held and conveyed to the cutting knives, and which are cut into individual pieces and discharged into a bin or basket.

Still a further object is to design a vegetable cutting machine which can be readily manufactured and assembled, and which is easy to maintain and operate.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

Figure 1:
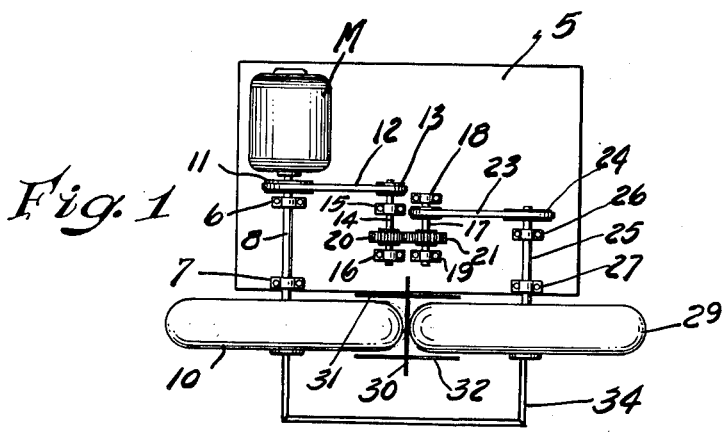
Fig. 1 is a top, plan view of my new vegetable cutting machine.

Referring now more specifically to the drawing in which I have shown the preferred embodiment of my invention, the numeral 5 indicates a base or support on which the mechanism is mounted, and comprises spaced-apart bearings 6 and 7 in which a shaft 8 is journaled in the usual manner.

A wheel 9 is mounted on the one end of the shaft 8 and this can be a conventional vehicle wheel equipped with a pneumatic tire 10 carrying about one pound of air therein, so that it is readily yieldable as it is driven to carry the potatoes P or other vegetables to the cutting elements.

A motor M is secured to the one end of the shaft 8 as shown and a sheave 11 is mounted on said shaft, a belt 12 drivingly connecting said sheave with a similar sheave 13 provided on the shaft 14, and which is journaled in bearings 15 and 16 provided on the base.

A similar parallel shaft 17 is mounted in bearings 18 and 19 directly adjacent the shaft 14, and intermeshing gears 20 and 21 drivingly connect said shafts, a sheave 22 being provided on the shaft 17 and a belt 23 drivingly connects said sheave with a similar sheave 24 provided on the shaft 25, and which is journaled in bearings 26 and 27, and a wheel 28, similar to wheel 9, is mounted on the shaaft 25 and has a pneumatic tire 29 as usual.

A vertically disposed cutting blade or element 30 is interposed between the wheels 9 and 28, and oppositely disposed cutting blades 31 and 32 cooperate therewith to form an H-shaped blade assembly, so that when the potato P is placed in the trough formed by the two tires, it will be carried downwardly as the device is driven, the soft pneumatic tires accommodating themselves to the shape of the potato, and forcing it against the blade assembly, cutting said potato into individual pieces. The operator's hands do not come into contact with the sharp cutter blades and the yieldable pneumatic tires firmly hold the potatoes in position.

A flared section 33 is provided at the lower end of the blade assembly and a container 34 is provided therebelow, and into which the cut pieces fall as the device is operated.

Figure 2:
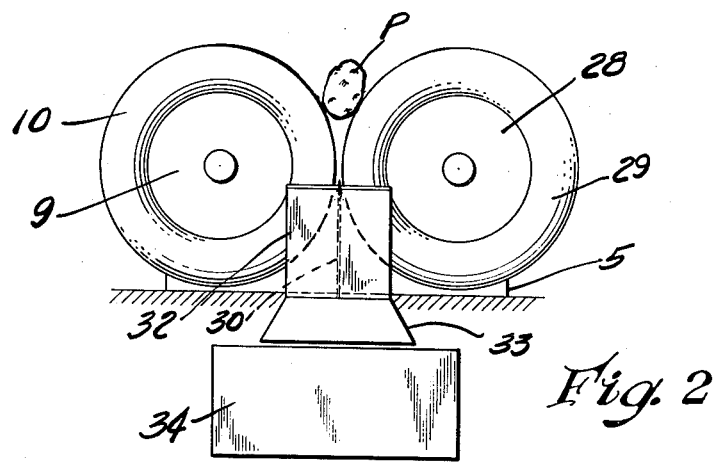
Fig. 2 is a side-elevational view thereof.
Figure 3:
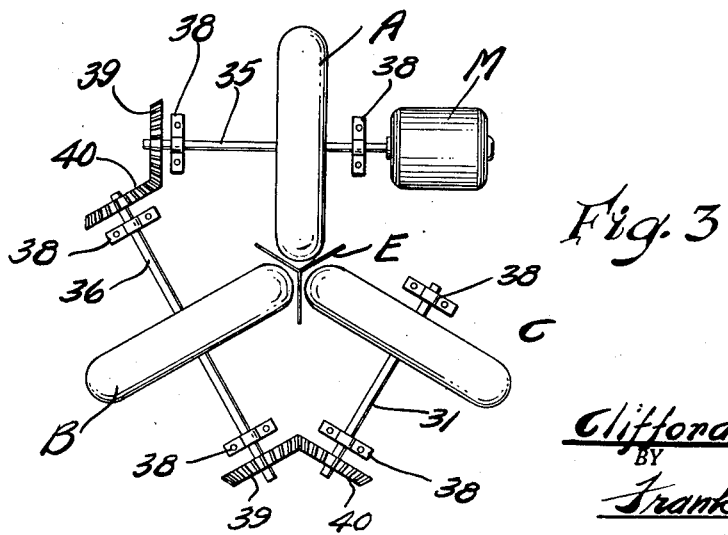
Fig. 3 is a top, plan view showing a slightly modified design.

In Fig. 3 of the drawing, I have shown a slightly modified construction in which three angularly placed wheels are used, these wheels A, B and C being mounted on the respective shafts 35, 36 and 37, said shafts being mounted in bearings 38 and bevel gears 39, 40 drivingly connect the shafts together, the shaft 35 being connected to the motor M for driving the wheels in the proper direction. No receptacle is shown as it is exactly the same as the arrangement shown in Fig. 2 of the drawing. The vegetables are fed into the trough formed by the wheels and are cut by the triangular-shaped cutting element E the same as previously described, the only difference being that there are three wheels and the cutting element is triangular-shaped, and while in the instant application I have shown two and three wheel assemblies, it will be understood that four or more wheels may be used without departing from the spirit of the invention.

From the foregoing description, it will be obvious that I have perfected a very simple, practical, smooth-operating vegetable cutting device which has large capacity and which is very easy and simple to operate.

What I claim is:

1. A vegetable cutting machine comprising revolvably mounted, vertically disposed wheels provided with pneumatic tires, carrying approximately one pound of air, disposed in approximately 120° cooperative relation and yieldable to form vegetable gripping pockets between the peripheral faces thereof to receive vegetables of relatively larger cross section than the transverse cross section of one of said tires, means for connecting said wheels to one another and to a motor for driving said wheels at the same speed, and a cutting element comprising blades extending from a common center outwardly at approximately 120° mounted between said tires and extending horizontally in a plane directly below the horizontal plane of the center lines of said wheels to cut said vegetables into a plurality of pieces when gripped by the peripheral walls of said tires and carried down against the cutting element.

2. A vegetable cutting machine comprising revolvably mounted, vertically disposed wheels each provided with pneumatic tires each carrying equal and relatively low gauge-pressure air, disposed in approximately 120° cooperative peripheral relation and readily yieldable to form vegetable gripping pockets between their peripheral faces to receive and transport vegetables of relatively larger cross section than the transverse cross section of one of said tires, means for connecting said wheels to one another so that their adjacent peripheral portions are moving mutually downward at the same peripheral speed and means for driving the wheels, and a cutting element comprising three vertically planar blades extending from a common center outwardly at approximately 120°, the common center being at the intersection of the center planes of the wheels, the tops of the blades extending horizontally in a plane near the horizontal plane of the center lines of the wheels, to cut vegetables into a plurality of pieces when gripped and downwardly transported by the peripheral tire walls and against the tops of the cutting blades.

References Cited in the file of this patent

UNITED STATES PATENTS

| | | |
|---|---|---|
| 1,388,574 | Kelling | Aug. 23, 1921 |
| 1,446,713 | Maceij | Feb. 27, 1923 |
| 1,499,950 | Smith | July 1, 1924 |
| 2,456,172 | Burns | Dec. 24, 1948 |
| 2,503,069 | Reichart | Apr. 4, 1950 |
| 2,547,702 | Hanna | Apr. 3, 1951 |